United States Patent [19]

Fogg et al.

[11] 4,163,342
[45] Aug. 7, 1979

[54] CONTROLLED ENVIRONMENT AGRICULTURE FACILITY AND METHOD FOR ITS OPERATION

[75] Inventors: Lewis W. Fogg, Cazenovia; Kenneth R. Rauhala, Baldwinsville; H. Eugene Satterfield, North Syracuse; Eion G. Scott, Fayetteville, all of N.Y.

[73] Assignee: General Electric Company, Syracuse, N.Y.

[21] Appl. No.: 889,965

[22] Filed: Mar. 24, 1978

[51] Int. Cl.² .............................................. A01G 31/02
[52] U.S. Cl. ............................................ 47/58; 47/65; 47/17; 47/59; 47/62; 47/82; 47/DIG. 6
[58] Field of Search .................. 47/17, 62, 59, 65, 39, 47/DIG. 6, 82-83, 58

[56] References Cited

U.S. PATENT DOCUMENTS

| | | | |
|---|---|---|---|
| 3,254,447 | 6/1966 | Ruthner | 47/65 |
| 3,824,736 | 7/1974 | Davis | 47/17 |
| 3,869,826 | 3/1975 | Fischer | 47/17 |
| 4,028,847 | 6/1977 | Davis et al. | 47/65 |
| 4,035,949 | 7/1977 | Ruthner | 47/17 |
| 4,035,950 | 7/1977 | Anselm | 47/59 |
| 4,059,922 | 11/1977 | DiGiacinto | 47/82 |
| 4,068,405 | 1/1978 | Campbell et al. | 47/65 |
| 4,118,891 | 10/1978 | Kehl et al. | 47/59 |

FOREIGN PATENT DOCUMENTS

2732982  2/1978  Fed. Rep. of Germany .............. 47/17

*Primary Examiner*—Robert E. Bagwill
*Attorney, Agent, or Firm*—Carl W. Baker; Richard V. Lang

[57] ABSTRACT

This disclosure is of a controlled environment agriculture system in which a plurality of plant grow support racks are arranged in an array complementary to that of the lamps which provide illumination for the grow racks, so as to provide two positions for the rack array in each of which positions alternate racks are fully illuminated and the others not. The lamps then may be operated continuously and the rack array shifted between these two positions to provide alternating periods of full illumination and relative darkness for each rack. Means also are provided for improving the uniformity of air distribution to all racks within the array, and for control of humidity within the system by adjustment of the rate of moisture removal by the air conditioners to balance that of moisture addition through plant transpiration.

11 Claims, 8 Drawing Figures

CONTROLLED ENVIRONMENT AGRICULTURE FACILITY AND METHOD FOR ITS OPERATION

BACKGROUND OF THE INVENTION

This invention relates generally to apparatus and methods for growing plants, and more specifically to controlled environment agriculture facilities and methods for plant cultivation in such facilities.

Controlled environment agriculture (CEA) is the cultivation of vegetable, ornamental and other plants in an enclosure within which those environmental factors which are generally recognized as influencing plant growth, maturation and productivity, are systematically time-programmed and carefully controlled. Typically the controlled growth factors include the intensity, duration and spectral distribution of illumination, the temperature, humidity and flow rate of the air, its carbon dioxide concentration, and the composition and temperature of the nutrient supplied to the growing plants. This latter parameter is most easily controlled in CEA installations in which hydroponics techniques are employed, as the nutrient solutions used with hydroponics may readily be analyzed for chemical composition and replenished as necessary to maintain their compositions within desired ranges of variation of the constituents.

A variant of the basic hydroponics technology which has been developing in parallel with CEA technology is the nutrient film technique developed by the Glasshouse Crop Research Institute, Littlehampton, England, and described in the following series of publications authored by Dr. A. J. Cooper of that institution:

"Improved Film Technique Speeds Growth", *The Grower*, Mar. 2, 1974.
"Hardy Nursery Stock Production in Nutrient Film", *The Grower*, May 4, 1974.
"Rapid Progress Through 1974 With Nutrient Film Trials", *The Grower*, Jan. 25, 1975.
"Soil? Who Needs It?", *American Vegetable Grower*, Aug. & Sept., 1974.

Briefly, the nutrient film technique employs sloped tubes or troughs, commonly called gullies, in which the plant roots are contained and through which a continuous nutrient solution flow is effected. The quantity of nutrient flow is carefully controlled and normally held at a rate such that only a small part of the root mass is contacted by the nutrient stream directly, capillary attraction or "wicking" being relied on to extend the nutrient-wetted area over and through the entire root mass. Nutrient solution not absorbed by the plant roots is collected and recirculated, usually after analysis of its compositional elements and replenishment of any deficiency.

The combination of controlled environment agriculture and nutrient film techniques is a particularly synergistic one, with promise of extremely high yields of very high and consistent quality from even a relatively small facility. Other important advantages may also be realized. For example, the programmed control of plant environment affords immunity to weather variations and extremes, the potential for maintaining essentially sterile environmental conditions avoids problems of plant diseases and pests without need for the use of insecticides or fungicides, and the closed cycle supply of air and nutrients enables close to one hundred percent effective utilization both of the nutrient chemicals and of the water in which they are in solution. Research and development facilities for nutrient film CEA investigation have demonstrated conclusively the technical feasibility of this agricultural system, and have similarly shown its capability to produce extraordinary yields.

While technical feasibility has thus been conclusively and dramatically demonstrated, economic feasibility heretofore has presented a more difficult challenge. Among the factors significantly impacting CEA economics are the relatively high and increasing costs of electrical energy in many parts of the world, which are of significance because substantial amounts of electrical power are required both to provide the high intensity illumination necessary to maximize plant growth rates and to provide heating and cooling of the atmosphere within the facility.

Another factor affecting CEA economics derives from the requirement of growing plants that they be subject to alternate periods of illumination and relative darkness, this being necessary to provide the plants with regular periods of "rest" during which the illumination level is below the compensation point—the point at which the plant respiration just equals photosynthesis. Conventionally this requirement is met by switching the lighting system periodically on and off, and as a consequence the lights remain idle for substantial periods of time and are not fully utilized. Since the lighting systems currently preferred for controlled environment agriculture application are high intensity discharge (HID) lamps representing substantial capital investment, these periodic periods of idleness represent poor utilization of that investment, and the necessary repeated switching of the lamps on and off tends to reduce their total operating life.

This necessary on and off cycling of the lamps tends also to raise substantially both the initial cost and the cost of operation of the air temperature control means. The wide variations in heat output of the lamps when switched on and off often makes necessary a higher capacity air conditioning system, so as to provide adequate cooling when the full array of lamps is switched on, and it may also necessitate a higher capacity air heating system to provide adequate heating capacity when the lamp array is switched off in cold weather environments.

Another problem common in conventional controlled environment agriculture facilities results from non-uniformities in the supply of conditioned air to plants at all locations within the facility. In facilities in which space is efficiently utilized by relatively close concentration of plants, and particularly where the plant grow support racks are to be tiered to provide vertical distribution of plants as well as horizontal, it becomes very difficult to maintain uniformity of air distribution and air flow about all of the plants. With conventional air supply and distribution arrangements there normally will exist substantial inequalities of temperature and areas of stagnation of air, neither of which conditions is conducive to optimized plant growth. Air humidity control has also presented a problem, which commonly has been resolved by provision of precision humidity measurement equipment and automatically controlled fogging or other moisture addition equipment. These equipments tend to be expensive, both in initial costs and in maintenance.

Finally, conventional layouts of controlled environment agriculture facilities, in which access corridors are provided between each of the plant grow supports, are relatively inefficient in usage of the available floor space within the CEA enclosure. Such inefficiencies in space utilization tend to drive operating costs upwardly.

The present invention is directed towards a controlled environment agriculture facility, and methods for its operation, providing substantial improvements in the foregoing and other problem areas common in conventional CEA installations. CEA facilities in accordance with the invention afford optimized utilization of the energy input to the facility and correspondingly reduced electrical costs per unit yield from it. The invention also is directed to the provision of controlled environment agriculture facilities which afford good efficiency of utilization both of space within the facilities and of the personnel required to man them, and which afford ready adaptability to cultivation of different crops as desirable to meet seasonal and other changes in market conditions.

A controlled environment agriculture facility in accordance with the invention comprises an environmentally isolated enclosure within which is housed a plurality of plant grow support racks of rectangular configuration each provided with means enabling at least restricted movement of the rack along a line parallel to its width dimension. The plant grow support racks are arranged in a column formation, in contiguous or very closely spaced relation with each other. This arrangement achieves full utilization of the entire floor space of the CEA enclosure, save only a clear workspace area which may be located at either end of the enclosure and which is of width dimension somewhat greater than the width dimension of the plant grow support racks. Access to a desired individual plant grow support rack then may be accomplished at any time by shifting all the racks in the column between the rack to be accessed and the nearest adjacent end of the column, thereby freeing a space adjacent to that rack.

To provide the desired alternation of high level and low level illumination periods, an overhead lamp array is provided made up of a number and variety of lamps selected to provide the desired intensity and spectral distribution of illumination. The lamps of the array are arranged in groups with the groups spaced along a line parallel to the direction of movement of the plant grow support racks, with spacing between the center lines of adjacent lamp groups being made equal to an integral multiple of the spacing between centers of adjacent plant grow support racks. With this spacing, movement of all the plant grow support racks through a distance equal to half the distance or spacing between lamp groups will shift each support rack between a first position in which it is directly under one of the lamp groups, and fully illuminated thereby, and a second position in which it is located midway between lamp groups and so receives relatively low illumination. The necessary periods of reduced photosynthesis activity required for optimized plant growth are thus provided, while requiring substantially fewer lamps and permitting all the lamps to be operated continuously rather than cyclically. At the same time, the periodic shifting of the plant grow support racks between their illuminated and non-illuminated positions provides adequate opportunity to access each rack for performance of all needed operations on it.

The plant grow racks preferably are self-contained with each providing a number of plant grow containers or gullies extending the length of the rack. The plant root masses are contained within these gullies, and are supplied with nutrient through individual flow regulators. Nutrient distribution manifolding, overflow and return systems all are mounted to each rack in a manner to permit its free movement subject only to the limits imposed by the necessary nutrient supply and drain connections. These connections are made sufficiently flexible and extensible to enable shuttling of the racks between the fully illuminated and non-illuminated positions described above.

The CEA enclosure preferably is made as gas tight as possible so as to minimize escape of its contained atmosphere, the $CO_2$ content of which may be enriched and controlled in conventional manner. The moisture or humidity content of the atmosphere also is controlled, and in accordance with the invention this is accomplished without requirement for an automatic humidity sensor and control system, simply by adjustment of means for variably bypassing the cooling coils of the air conditioning system so as to control the amount of water vapor removed thereby. It has been found possible in this way to maintain a balanced state between the amount of moisture added to the air through plant transpiration and the amount removed by the air conditioners, without need for fogging or other such water addition into the enclosure.

For optimized distribution of air and uniformity of air supply to and through each of the plant grow support structures, the air return system through which air is recirculated from the enclosure back to the air conditioning equipment includes a plurality of air flow control means. These control communication between the interior of the enclosure and the air return ducts, with at least one such control means being located in immediate association with each of the plant grow racks. This enhances equalization of the air flow to the individual racks and helps protect against stagnation of air adjacent to any of them. Alternatively, the air flow control means may be structurally integrated into the plant grow support racks, with rack movement then being permitted by flexible and extensible connections between the rack-carried air return structure and the fixed air return structure of the enclosure.

Substantial economies and improvements in efficiency, both technical and economic, result from the integrated configuration of plant grow support racks, arranged for mobility in the manner and to the extent described, with the lamp locations and spacings coordinated with support rack movement as described. This provides the desired capability for alternating periods of high level and low level illumination while permitting continuous operation of the lamps. At the same time, the control and equalization of distribution of conditioned air within the enclosure in the manner described minimizes temperature variations and areas of stagnation of the atmosphere, at all rack positions within the enclosure.

Typically, for example, with a CEA facility configuration having 50 percent of the floor area lighted continuously by overhead lamps and the plant grow support racks shifted between the full and low level illumination positions as herein described, only 30-60 percent as many lamps are required as would be the case if the lamps were switched on and off and covered the entire cropping area in conventional manner. Additionally, the resulting constancy of lamp heat output is beneficial for the reasons previously noted, and the lamps and their ballasts should offer longer life expectancies. These and the other cost efficiencies resulting from the use of controlled environment agriculture facilities in accordance with the invention substantially reduce the net cost per unit of product and enhance the economic viability of such facilities for large scale commercial application.

BRIEF SUMMARY OF THE INVENTION

In accordance with a first important aspect of the present invention, there is provided a controlled environment agriculture facility including a plant growth enclosure within which a controlled atmosphere may be maintained, and in which a plurality of rectangular plant grow support racks are disposed. Each rack is adapted to provide support for one or more plant grow gullies spanning the length dimension of the rack and provided at one end with nutrient supply means and at the other with a drain connection. The gullies are gently sloped so as to cause gravity induced flow of nutrient along the same, and they are adapted to contain the plant roots with only the lower part of the root mass normally contacting the nutrient stream. The racks are positioned with little if any spacing between them, and they are provided with casters or like means permitting their movement along a line parallel to their width dimension. For this same purpose, the plant grow rack connections to the nutrient supply and return means are made flexible and extensible.

A plurality of lamps are mounted in the enclosure above the racks, the lamps being arrayed into groups with the lamps of each group disposed along a line parallel to the length dimension of the racks and with the lamp groups spaced along a line parallel to the width dimension of the racks. The number of these lamp groups is correlated to the number of support racks as a fractional multiple thereof, whereby each of the lamp groups is positioned so as to fully illuminate the adjacent rack when the rack occupies a first position more or less directly below that lamp group and provides substantially less illumination to the rack when shifted to another position more remote therefrom. This enables even distribution of illumination as between the plant grow support racks while affording alternating intervals of relatively high and relatively low illumination simply by shift of the rack array position.

CEA facilities in accordance with the invention also comprise conditioned air supply and recirculation means including a source of temperature-controlled and $CO_2$ enriched air, and air distribution means disposed within the enclosure above the plant grow support racks with air distribution outlets adjacent each of the racks. Air return duct means are provided for return of air from the enclosure and include a plurality of air flow control means controlling communication between the air return and the enclosure, with at least one of these flow control means being located in immediate association with each of the plant support racks thereby to enhance equalization of air flow to and through all the racks. These air flow return means, like the lamps, preferably are spaced along a line parallel to the width dimension of the racks in a manner such that the number of air flow control means is correlated to the number of support racks as an integral or fractional multiple thereof, to maintain the desired close association of one of the air flow control means with each of the racks in both of its positions.

For control of humidity within the enclosure, the air conditioner units preferably are provided with diverter valves enabling the by-pass of a controllable fraction of the return air flow so as not to pass through the chilling coils of the units. Then simply by proper adjustment of these valves it is possible under most operating conditions to maintain humidity at acceptable and stable levels without need for foggers or other water injection devices, or automatic controls therefor. This method of humidity control, and the other horticultural methods of the invention utilizing CEA facilities configured as just described, together assist in providing optimized crop yields at minimized unit yield costs.

BRIEF DESCRIPTION OF THE DRAWINGS

The novel and distinctive features of the invention are set forth in the claims appended hereto. The invention itself, however, together with various of its further objects, features and advantages, may best be understood by reference to the following detailed description and the accompanying drawings, in which;

DESCRIPTION OF THE PREFERRED EMBODIMENT

Figure 1:
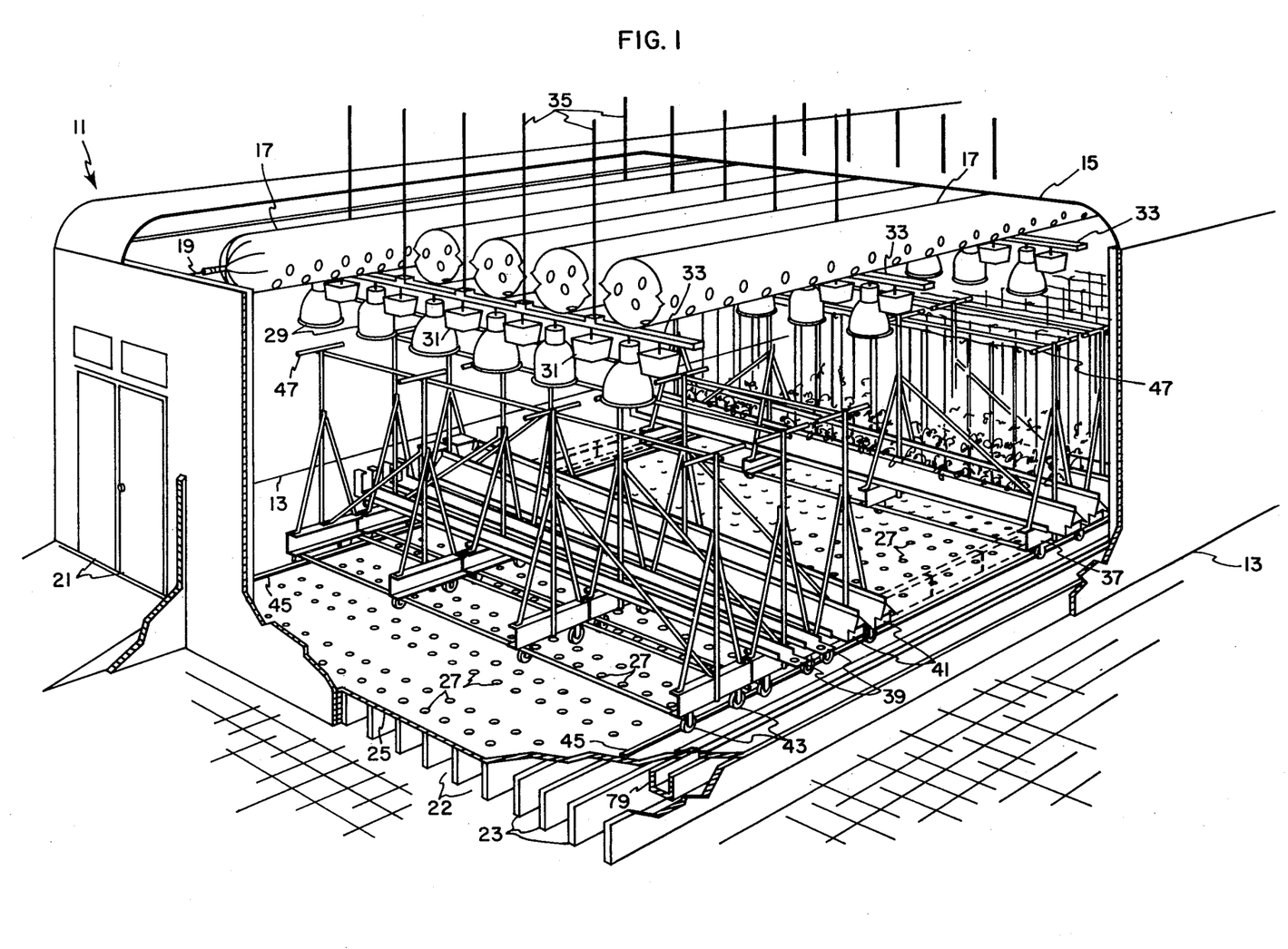
FIG. 1 is a perspective view of the interior of a controlled environment agriculture module, illustrating the general layout of the lamp array, conditioned air supply and return arrangements, and plant grow support racks within the module.

With continued reference to the drawings, wherein like reference numerals have been used throughout to designate like elements, FIG. 1 illustrates a controlled environment agriculture facility or module in accordance with the invention. As illustrated, the module designated generally by reference numeral 11 is housed within a building or other larger enclosure which provides shelter for the air conditioning and other support equipment not visible in FIG. 1. It will be appreciated that such exterior housing need not necessarily be provided, and that the module could instead be constructed as a free-standing unit with space provided within it for such necessary support equipment as can not be located out of doors.

The module comprises vertical walls 13 and a top wall or ceiling 15 which, by reason of the positive pressure normally maintained within the module, may economically and conveniently be fabricated of plastic film material sealed to the module wall around its periphery and held in upwardly inflated position by the positive pressure of the atmosphere within the module. The module air supply system is operated in a closed cycle, with $CO_2$—enriched air of controlled temperature and humidity being supplied under pressure into the module through an array of perforated plastic air distribution tubes or headers 17 disposed parallel to each other adjacent to the ceiling of the module. These distribution headers are formed of film plastic which collapses when the pressurized air supply to them is cut off; to hold them in position under such conditions the cords 19 by which the free ends of the tubes are tied closed may be affixed to any convenient support, as for example the adjacent end wall of the module, to thus maintain the tubing in stretched condition ready for inflation upon supply of air pressure to its interior.

The air supply preferably is at a pressure substantially above atmospheric, so as to enhance the equalization of air distribution through the apertures of the headers throughout the enclosed space of the module, and to maintain the air pressure level within the module at a substantial differential over atmospheric. This minimizes the possibility of entrance of external air except through the air conditioning system. To this same end, the access doors to the module preferably are provided with airlocks (not shown) to conserve against air loss when the module doors 21 are opened for personnel ingress and egress.

Figure 6:
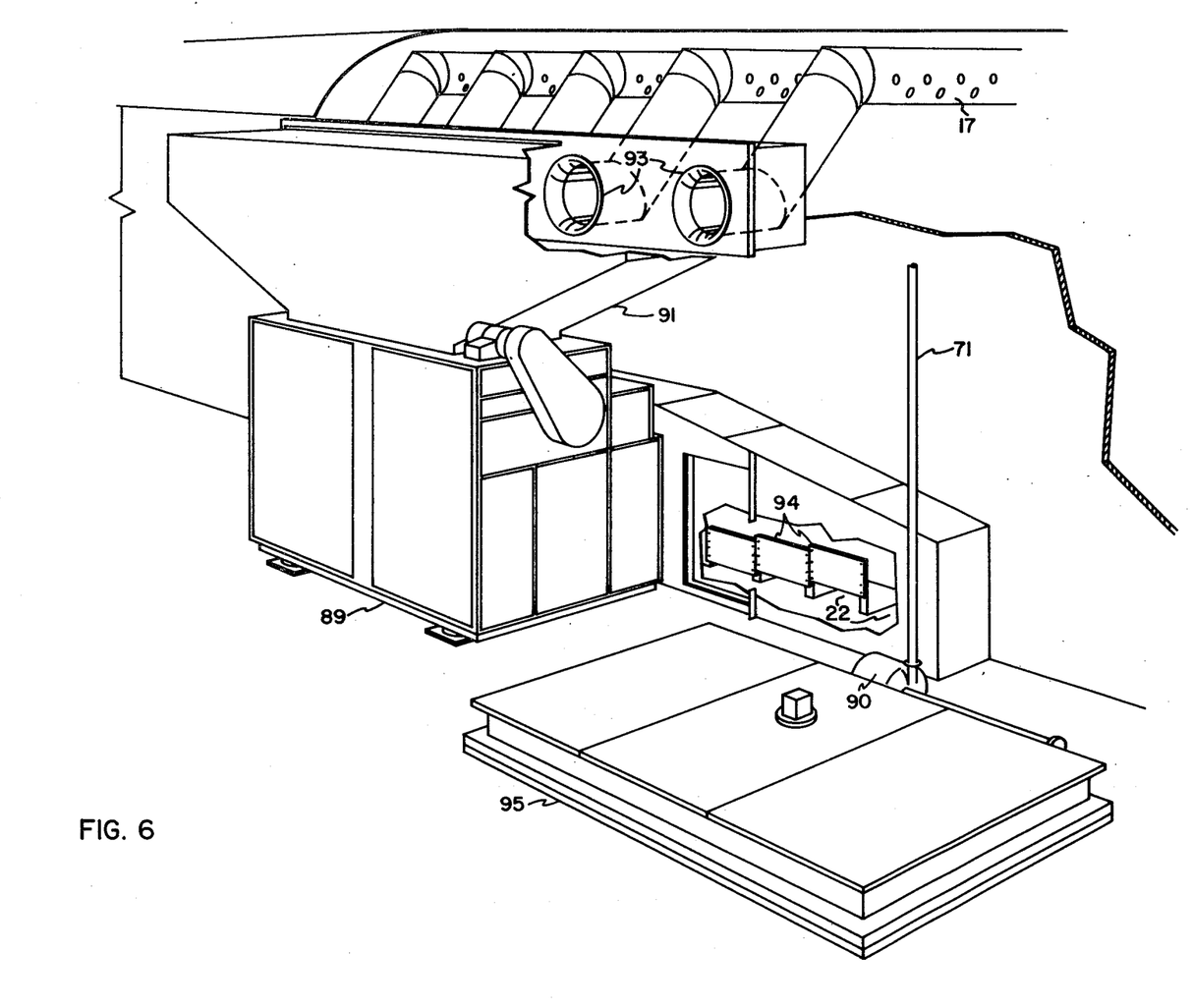
FIG. 6 is a part sectional view of the module of FIG. 1, illustrating the conditioned air supply system and means for equalizing air distribution within the module.

The air system is a recirculating one with return air from the module being passed through ducts 22 formed by and between the joists 23 which support the module flooring 25 as shown. Flow of return air from the interior of the module into the return ducts 22 thus formed is controlled by groups of holes 27 which are drilled or otherwise formed in the flooring 25 in a pattern correlated to the plant grow support rack arrangement in a manner further described hereinafter. The ducts 22 return the air from the module interior back to the air conditioning units as shown in FIG. 6 and as will be later discussed with reference to that figure.

Applicants have found that high intensity discharge (HID) lamps of the kinds marketed by the General Electric Company under the trade names LUCALOX® and MULTIVAPOR® are economically more advantageous than fluorescent lamps for CEA horticulture, particularly for vegetable crops such as tomatoes, lettuce and cucumbers. To reduce the heat load on the system air conditioners, the lamps 29 preferably are provided with individual heat exchange structures as disclosed and claimed in copending applications Ser. No. 868,527 and Ser. No. 868,531, both filed Jan. 11, 1978 in the names of Vakil and Silverstein and both of common ownership herewith. As described in those applications, the light generating elements of the lamps are air-jacketed with cool air being supplied to the jacket inlets from the module air supply. The heated air exhausted from the jackets is discharged outside the module by suitable exhaust ducting (not shown).

The spectral distribution of illumination provided by the lamps 29 may be varied by changing the ratio of the numbers of the two different lamp types. To facilitate such changes, and also to enable change of the total number of lamps to control the intensity of illumination, the lamps and their associated ballasts 31 preferably are mounted to busways 33 suspended just beneath the air conditioning distribution headers 17 by supports 35 from the overhead structure (not shown) of the building within which the module is enclosed. These busways 33 are of the type commercially available from the General Electric Company and other suppliers, and they include tracks along which the lamps may adjustably be positioned so as to accommodate the desired number of lamps spaced uniformly along the busway. As shown in FIG. 1 there are six lamps in each group with four of the lamps being of the type designated LUCALOX by General Electric and the other two of the type designated MULTIVAPOR by that company. This combination has been found a particularly satisfactory one for tomato cultivation; for other crops different numbers and combinations of lamps may quickly and easily be substituted by virtue of the busway mounting.

The plant grow support tracks 37 are shown in FIG. 1 with the gullies and gully support structures carried by each rack in different stages of assembly, to better illustrate the construction of these elements. Thus, progressing from left to right in FIG. 1, the first plant grow support rack assembly 37 is essentially the bare rack; the second rack assembly includes plant grow gully supports 39 which as shown comprise trough members extending the full length of the rack; the third rack assembly has had placed on the trough members 39 plastic gully structures 41 within which the plants are to be cultured; and the rack assemblies on the right-hand side in FIG. 1 are shown with their gullies planted in a crop.

To enable utilization in accordance with the horticultural methods of the present invention, the plant grow racks 37 are provided with casters or wheels 43 at least some of which operate in conjunction with tracks 45 fixed to the floor 25 as shown to constrain rack motion to movements parallel to the width dimensions of the racks. To this same end, the rack configuration and dimensions are coordinated with the geometry of the overhead lamp array and with the pattern of air flow control apertures 27 in the flooring 25 as better shown in FIG. 2 and as will be discussed later with reference to that figure.

Figure 3:
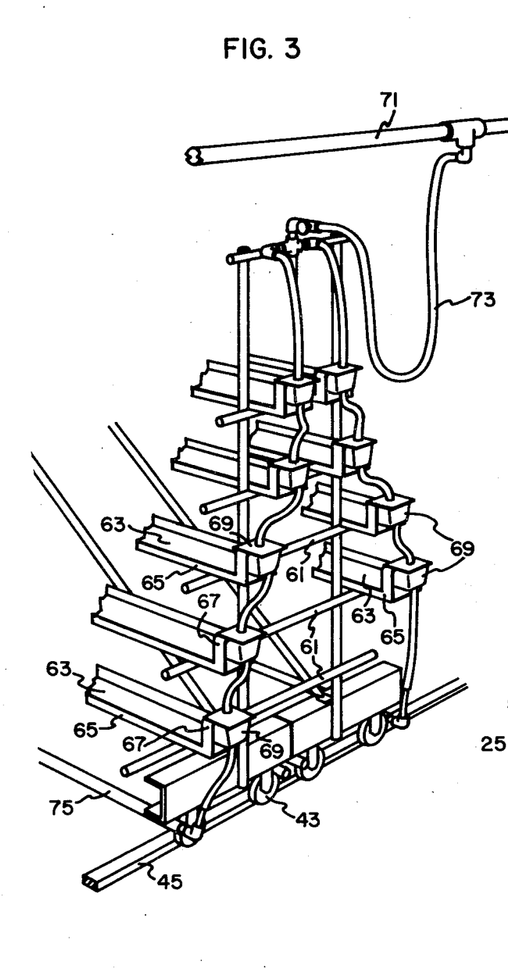
FIG. 3 is a perspective view of the supply end of a plant grow rack suitable for use in the module of FIG. 1, illustrating the nutrient supply and flow regulation means carried by the rack.
Figure 4:
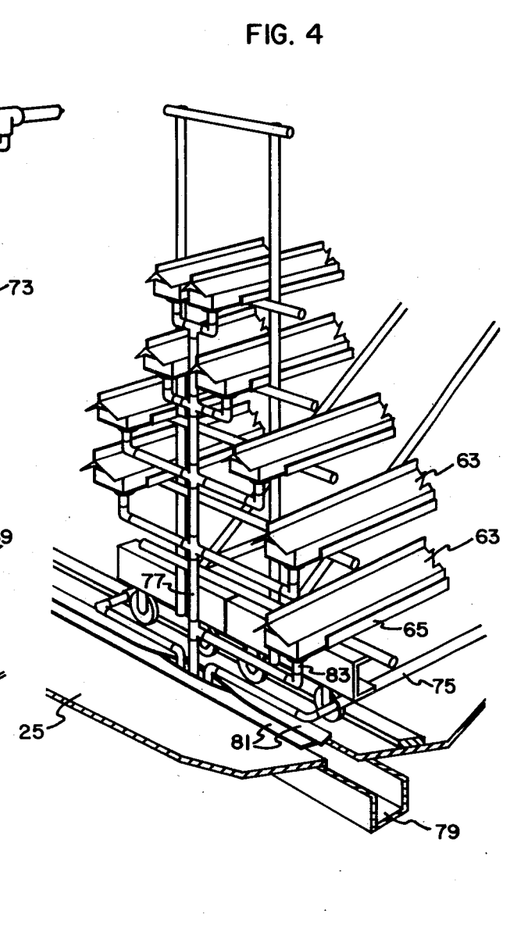
FIG. 4 is a similar view of the drain end of the plant grow rack of FIG. 3, illustrating the excess nutrient drain and return means carried by the rack.
Figure 5:
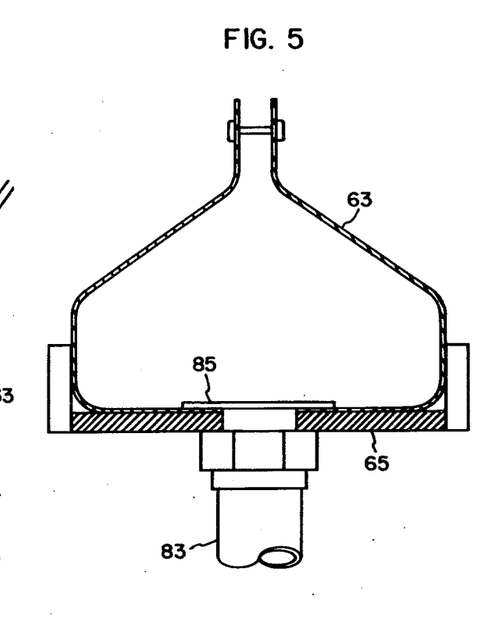
FIG. 5 is a cross-section through one of the plant grow gulley structures, showing its drain connection.

Each of the rack assemblies 37 comprises nutrient feed supply, distribution and return fittings which for purposes of clarity have been omitted in FIG. 1, with the supply fittings located at one end of the rack and the return at the other. The gully support structures comprise U-section metal trough members 39 extending lengthwise of the module and supported at the nutrient supply end (the left-hand end in FIG. 1) at a level higher than at the nutrient drain end so as to induce fluid flow at predetermined flow rate along the length of the gully. The gullies themselves, as will be more apparent from FIGS. 3-5, are formed of plastic strip material bent to a closed box section with the upper edges of the plastic being brought together and held by suitable clip members disposed between adjacent plants in conventional manner. This provides support for the plant stems and also limits the access of light to the gully interiors. If the crops under cultivation are plants such as tomatoes which tend to grow sufficiently high to require support for their stems, such support may be provided as by ties suspended from lines strung between crossbars 47 at the tops of the plant grow support racks as shown at right in FIG. 1.

Figure 2:
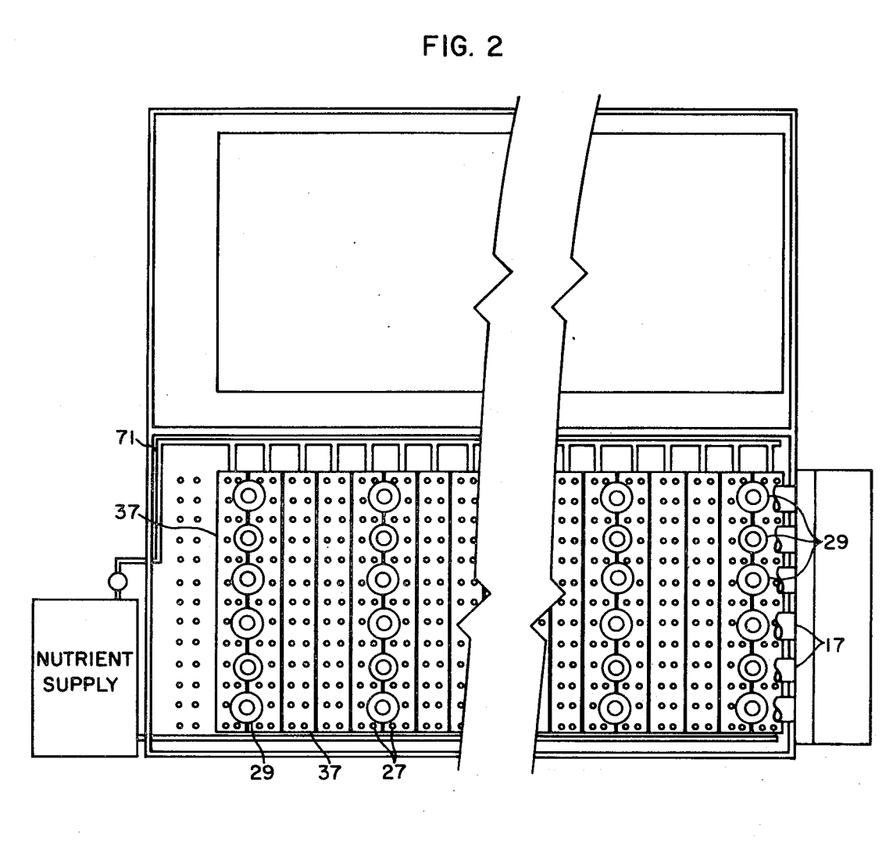
FIG. 2 is a representative floor plan layout of a module like that of FIG. 1, illustrating the positional interrelationships of the lamps, plant grow support racks and air supply and return means.

Turning now to FIG. 2, this is a plan view of a module similar to that of FIG. 1 illustrating more clearly the dimensional and positional interrelationships of the array of lamps 29, the plant grow support racks 37, and the return air flow control apertures 27 in the module flooring. As shown, the number of racks within the module is correlated with the number of groups of lamps as an integral multiple thereof, so that alternate pairs of the grow racks are positioned directly beneath the adjacent lamp group and spaced midway between lamp groups. With this arrangement, half the grow racks are at any given time fully illuminated by the adjacent lamps and half are located midway between lamp groups and so are not fully illuminated.

We have found that plants moved into this latter position, while appearing to the eye to be well lighted, are subjected to levels of illumination which actually are below the compensation point at which plant photosynthesis equals respiration. To enhance this effect, and to provide sharper lines of demarcation between illuminated and non-illuminated areas, the reflectors or luminaires associated with each of the lamps 29 may be configured to focus and shape the lamp output into a concentrated and well defined pattern preferably of generally rectangular outline. The array of lamps then will produce a more clearly visible pattern of alternating light and dark bands each of width approximately the width of one or more grow racks, so that by shuttling the racks back and forth each is subjected to successive periods of full illumination and relative darkness.

Thus in accordance with the CEA plant husbandry methods of this invention the plant grow racks are reciprocated or shuttled between positions more or less directly beneath the overhead lamps and positions approximately midway between those lamps, to provide the necessary diurnal fluctuations in plant leaf temperature. Grow rack movements back and forth between these positions are effected on time cycles which may vary anywhere between perhaps 2 hours and 24 hours. In production operations, it generally will be found convenient to couple these periodic shifts in position of the plant grow racks with performance of the various operations necessary to care for the plants growing on them, as for example the pollenization of tomato flowers, pruning of foliage, removal of undesired growth, and harvesting of fruit in the case of tomatoes, cucumbers and the like. As each plant grow rack is shifted in turn, starting at one end and working toward the other, a space will be opened up between the tier or racks already moved and those not yet moved, and this space is adequate to enable access by operators to perform the chores just enumerated and others as needed. Then when these operations are completed on each rack, that one is moved on and operations commenced on the next.

As will be obvious to those skilled in the art, the plant grow support racks may if desired be provided with mechanical means for effecting their movement selectively. Thus the individual racks could be motorized if desired, or a cable or chain drive system provided for moving them.

One difficulty which has been experienced in controlled environment agriculture is that of maintaining a well equalized and constant flow of air about all the plants throughout the grow area. In accordance with the invention this is accomplished in a closed loop recirculating system, by constraining the return air flow to passage through a plurality of flow control means each arranged in association with one of the plant grow support racks so as to enhance the uniformity of air flow to all the racks. As illustrated in FIG. 2, these flow control means take the form of patterned arrangement of apertures 27 through the flooring, a group of such apertures being located directly beneath each rack position as shown. These apertures 27 may be approximately 1 to 2 inches in diameter, depending upon their number, and due to the pressure differential across them they tend to maintain equalized flow through each. They serve thus as air flow control means, and since each aperture group is associated with one of the plant grow racks in either of its two positions, they promote in this way good uniformity of distribution of air flow over all the racks irrespective of location within the module.

With this arrangement of lamps, plant grow support racks and air flow control means, and operating in accordance with the methods just described, the lamps may be kept on at all times, thereby enhancing lamp and ballast life and achieving 100 percent utilization of the investment represented by the lamps. The relative constancy of heat load thus provided also is helpful in reducing the air conditioner maximum load requirement and in assuring the constant availability of heat for the module and associated facilities during cold weather periods, thus reducing or eliminating any requirement for additional heat supply.

To enable movement of the plant grow racks as required for practice of the methods just described, it is necessary that the nutrient supply and return connections to the racks be such as to permit at least limited movement of the racks within the module. Structure for accomplishing this is illustrated in FIGS. 3 and 4, which illustrate also in greater detail the rack and plant grow gully structure in an assembly in which adjacent racks are paired or "twinned". In these figures two of the single racks of FIG. 1 have been joined as by cross bars 41 to form a double rack assembly supporting a plurality of plant grow gullies 63 arranged in a tiered or pyramidal configuration, which achieves maximum space utilization while affording each gully and the plants growing within it clear exposure to the overhead illumination.

The support troughs 65 in which the gullies are positioned are formed of U-section sheet metal members running the full length of the plant grow rack, and have integrally formed upstanding bracket members 67 formed at the inlet end (shown in FIG. 3) for support of the plant nutrient flow regulators 69 through which a flow of nutrient at constant flow rate is supplied into the adjacent end of each of the gullies. These flow regulators preferably are of the type disclosed and claimed in copending applications Ser. No. 848,818, filed Nov. 7, 1977 in the name of W. M. Miller and assigned to the assignee of the present application.

Nutrient from the fixed overhead main supply line 71 is connected to the grow rack nutrient distribution system through a flexible conduit 73 of sufficient length and flexibility to permit movement of the rack assembly with respect to the main supply line through a distance adequate to enable movement of the rack assembly between its illuminated and non-illuminated positions as previously described.

As shown in FIG. 3, and as more fully explained in the aforementioned Miller application, the several flow regulator units 69 in each tier are connected in a series flow arrangement in which the overflow from the uppermost regulator is ducted to the inlet of the next lower one and the overflow from the bottom-most regulator then is connected to a drain line 75 which runs beneath the rack assembly to its opposite end and there is connected to drain in a manner to be described. As also more fully explained in the Miller application, the flow regulator provided for each of the plant grow gullies supplies into that gully a constant regulated flow of nutrient liquid, adequate to maintain a steady but very low volume stream of nutrient along the length of the gully with flow therein induced by the slight downward slope of the gully as previously described.

In FIG. 4, which illustrates the drain end of a plant grow support rack, all liquid not absorbed by the plant roots as it flows past them is connected into one of the branches of a drain tree assembly the center or common drain line 77 from which extends downwardly into a nutrient return duct 79 located beneath the module floor as illustrated. The slot in the flooring through which the drain line projects into duct 79 preferably is covered by rubber or Neoprene strips 81 secured along the edges of the slot. These strips 81 then are parted to receive the drain line 77 as well as the overflow lines 75 from the supply end of the rack assembly. Free movement of the rack assembly without interruption of its drain connections then is provided by movement of the drain line ends within the underfloor duct, as permitted by the resilient strips 81.

Details of the drain connection into one of the plant gullies is shown in section in FIG. 5, which also illustrates in greater detail the configuration of the plastic gully 63 and the manner in which it is formed. As previously described, the gully is formed of plastic strip material bent to a closed pentagonal-section shape, and at its drain end the gully is closed by an upwardly bent flap of the plastic material. Adjacent this end, mating holes in the gully and its support trough 65 enable connection to the branch drain line 83 which opens through the hole, with the connection being completed through a conventional drain fitting 85. In this way the drain connection to the gully is accomplished in a manner permitting ready separation of the gully when it is to be removed and replaced.

It will be noted that the plant gulley arrangement in the particular embodiment illustrated in FIGS. 3 and 4 is not symmetrical, there being one gully on the lowermost level of the rack on the left-hand side as seen in FIG. 3 which is not matched by a gully in the corresponding position on the righthand side. Since adjacent rack assemblies are in directly contiguous relationship with each other, this omission of one gully prevents the mechanical interference and blockage of illumination which otherwise could occur if there were gullies in the lower-most positions on both of the adjacent rack assemblies. It will also be noted that the racks need not necessarily be paired together or the plant grow racks tiered as illustrated in FIGS. 4 and 5; the racks may when preferred be kept separate and their gullies placed all on the same level as illustrated in FIG. 1. When this is done the two nutrient flow regulators carried by each rack would be connected in parallel, rather than in series flow relationship, as more fully explained in the aforementioned copending application of Miller.

Turning now to FIG. 6, there is shown some of the support equipment for the module of FIG. 1, including air conditioning equipment 89 connecting to the supply air distribution ducts 17 previously described. Certain elements of the nutrient system, including the supply and return lines, one of the pressurizing pumps and the nutrient reservoir, also are visible in FIG. 6. As shown here in simplified form, the nutrient supply line 71 which is pressurized by pump 90 runs to and along the top of the module and connects to the plant grow rack assemblies in the manner previously described. The previously described drain lines from the grow racks connecting through the module floor and into the return duct below it carry excess nutrient back to the reservoir 95 through a connection not shown.

The air conditioning equipment 89 includes the blowers, temperature and humidity control equipment for the module air. Depending upon the climate in which the module is operated this equipment advantageously may take the form of a heat pump providing both heating and cooling depending upon which is needed from season to season, or it may comprise the evaporator coils of a conventional air conditioner together with resistanceheating resistance heating if the inclusion of such are made necessary by exigencies of the particular climate involved. The air conditioner 89 furnishes its conditioned air output into a plenum chamber 91 into which each of the distribution headers 17 is connected. Preferably each such connection is accomplished through an equilibrating orifice as shown at 93, which orifice tends to smooth the air flow into the associated air distribution header and to help equalize flow between headers.

Flow equalization in the air return ducts 22 formed between the flooring and the floor joists is enhanced by provision of gate valves 94 which are adjustable to provide progressively greater open area at duct positions remote from the air conditioning unit 89. The return air flow from each of the air ducts 22 is made thus independently adjustable to achieve equalization of air flow over the rack assemblies in the direction parallel to their length dimensions; the orientation of the holes or apertures in the module flooring as previously described enables equalization of air flow over the rack assemblies in the direction parallel to their width dimension. By factoring both these features into the module design it is possible to provide well balanced and equalized air flow both along the length of the modules and across their width.

Figure 7:
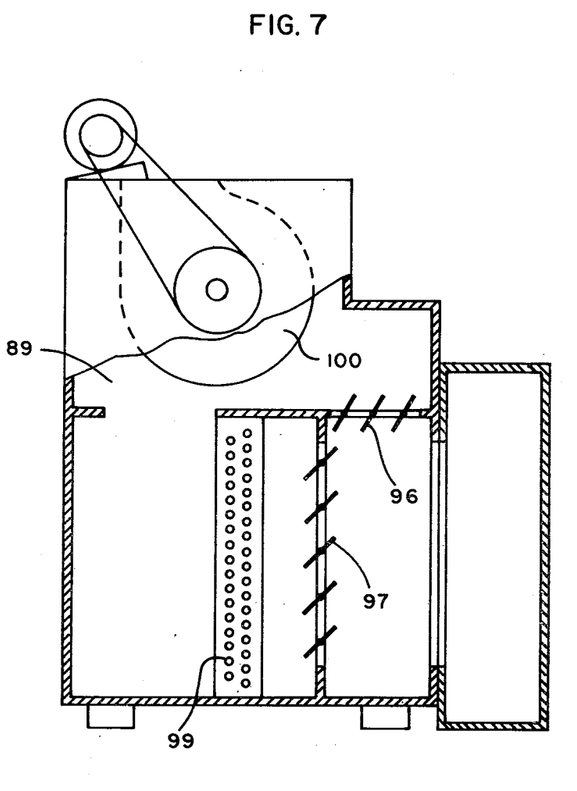
FIG. 7 is a part-sectional view of one of the air conditioner units of FIG. 6, showing its diverter valve as employed for humidity control.

Humidity control as essential to plant growth may be accomplished in accordance with the invention by an air bypass system incorporated into the air conditioners as best illustrated in FIG. 7. This system permits dividing the returning air and passing only a specific portion through the evaporator or chilling coils 99 of the air conditioner 89. The fraction of the total return air flow thus diverted is controlled by adjustment of variable vanes 96 and 97 which are interconnected by mechanical linkage (not shown) such that as the vanes 96 are opened the vanes 97 close, and vice versa. That part of the return air flow which is passed through the chilling coils has its contained water removed as well as reducing the temperature. That portion not passed through the chilling coils retains its total water vapor and when blended with the chilled dry air at the entrance into the air blower 100 becomes a total air mass at the specified temperature and humidity.

Using these air bypass control vanes, which are conventional in themselves, we have found that it is possible in a controlled environment agriculture facility in which the air conditioner capacity, CEA enclosure volume and total plant content are properly interrelated and average ambient temperature properly factored in, to maintain essentially constant humidity in the enclosure without need for fogging or other injection of any water or moisture into its atmosphere. This is accomplished simply by occasional adjustment of these air bypass control vanes. The desired system balance is achieved and maintained when the amount of water transpired into the atmosphere by the plants on a daily basis just equals the amount of water vapor removed by condensation on the air conditioner evaporation coils 99. Since the nutrient supply to all the plant grow racks is continuous, and since at any given time half of the racks always are fully illuminated, total plant transpiration within the module remains more or less constant except for the very gradual increase which occurs as the plants grow, and this may be compensated by the occasional control vane adjustments previously alluded to.

The method just described for humidity control in the controlled environment facility of this invention is particularly effective in minimizing the consumption of water by the facility, since the only water lost is that condensing on the air conditioner evaporator coils, and even that amount if conserved and recycled simply by collecting the condensate. At the same time, the simplicity and reliability of control of module humidity in this manner affords a very substantial advantage over the automatic humidity sensor and control systems conventionally employed.

An understanding of the horticultural methods of the present invention will have been provided by the foregoing discussion of the structure and operation of the various subsystems of the controlled environment agriculture facility of FIGS. 1–7. In setting up the facility for a particular crop, say tomatoes, the plant grow support racks are configured or reconfigured to provide the desired number of gully supports per rack, and to provide a vertical and horizontal spacing between gullies suitable for the growth habits of the particular crop to be grown. Tomatoes, depending upon the variety, may be grown with the gullies either in tiered configuration (FIGS. 3 and 4) or flat (FIG. 1).

Again consistent with the requirements of the particular crop to be grown, the lamp array is configured to provide the desired intensity and spectral distribution of illumination, lamps being added, subtracted or substituted as necessary to meet these requirements. Air temperature and humidity requirements also may differ from crop to crop; temperature change if needed may be accomplished by conventional thermostat means. Humidity control is provided by adjustment of the air conditioner bypass valve means as hereinbefore described; if a change in humidity is desired or if an undesired change resulting from a change in another operating parameter requires correction, this may be accomplished simply by readjustment of the air bypass ratio.

With these changes and adjustments, together with any changes in composition or concentration of the plant nutrient solution needed to adapt to the nutritional requirements of the crop to be grown, the facility may quickly and easily be set up to accommodate a wide variety of plants and to provide wide variations in growing conditions without change of equipment.

Figure 8:
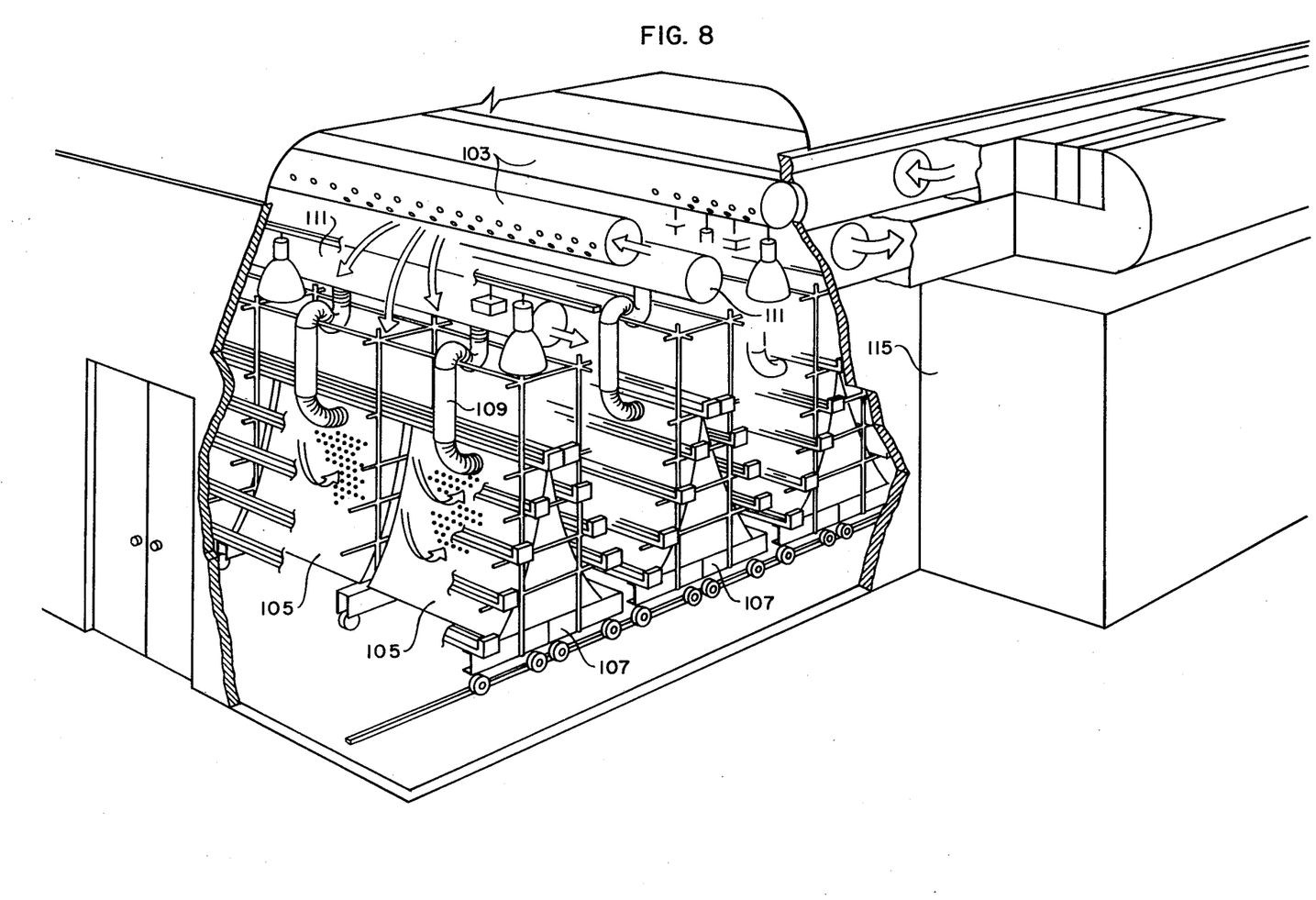
FIG. 8 is a perspective view of an alternative embodiment of CEA module employing rack-enclosed return air ducts.

With reference next to FIG. 8, an alternative embodiment of the invention is illustrated differing from that previously described primarily in the air return system. In FIG. 8, the supply air distribution system including the film plastic distribution headers 103 is generally similar in configuration and function to that of FIG. 1, except that it will be noted that here the air distribution headers run parallel to the length dimension of the plant grow support racks rather than normal thereto as in the earlier described embodiment. Both arrangements provide acceptably equalized distribution of conditioned air into and within the enclosure.

The air return system of FIG. 8 is substantially different, however, in that here the air flow control means associated with each of the plant grow support racks takes the form of a perforated wall structure 105 defining an air collector or plenum chamber disposed within each of the rack assemblies 107. As shown, these collector structures are of triangular section conforming to the rack configuration, and have perforated film plastic side walls. They are connected adjacent their upper ends by flexible conduits 109 each connecting into an overhead air return duct 111. These return ducts 111 connect at the end of the module back to the inlet of the air conditioning system 115 for recirculation.

As in the embodiment of FIG. 1, the disposition of an individual air flow control means in close association with each of the plant grow support racks, in this case by integration of the return air collector structure into the rack assembly itself, enhances the equality of distribution of conditioned air to the individual racks and helps protect against stagnation of air in the vicinity of any of them.

The methods of operation and use of the system of FIG. 8 are essentially similar to those described hereinabove with reference to the embodiments of FIGS. 1–7. Like them, this system affords wide versatility and flexibility of application in that all variables that are controlled can readily be adjusted to accommodate to the different conditions required by different crops without any change of equipment and generally with only minor adjustments of components required.

What is claimed and desired to be secured by Letters Patent of the United States is:

1. A controlled environment agriculture facility comprising:
   (a) wall and floor means defining a plant growth enclosure within which a controlled atmosphere may be maintained;
   (b) an array of plant grow support racks disposed within said enclosure, each said rack being of rectangular configuration with width and length dimensions and including means mounting the rack for at least limited reciprocal movement along a line parallel to its width dimension, the racks being arrayed in proximity to each other with their length dimensions in parallel relation;
   (c) a plurality of lamps mounted in said enclosure above said racks and divided into groups with the lamps of each group disposed along a line parallel to the length dimension of the racks and with the lamp groups spaced along a line parallel to the width dimension of the racks, the number of such lamp groups being correlated to the number of support racks as a fractional multiple thereof;
   (d) said plant grow support rack array being movable back and forth between a first position in which alternating racks of said array are disposed in sufficiently direct proximity to a respective one of said lamp groups to be subjected thereby to relatively high intensity illumination and in which the other racks of said array are disposed more distantly from the most proximate of said lamp groups so as to be subjected thereby to substantially lower intensity illumination, and a second position in which the relative intensities of illumination of the racks of said array are reversed, thus enabling even distribution of illumination as between all the plant grow support racks by shifting the plant grow support rack array back and forth between its first and second positions.

2. A controlled environment agriculture facility as defined in claim 1, further including atmosphere control means for said enclosure comprising;
   (a) a source of conditioned air including air distributor means for distribution of supply air within said enclosure;
   (b) air return duct means for return of air from said enclosure to said source; and
   (c) a plurality of air flow control means controlling communication between said air return means and the interior of said enclosure, at least one of said flow control means being located in respective association with each of said plant support racks in each of said first and second positions thereof to assist in equalization of air flow to and through the plants growing thereon.

3. A controlled environment agriculture facility as defined in claim 2 wherein said air return duct means are disposed beneath said enclosure floor means and wherein said air flow control means comprises one or more apertures disposed beneath each of said plant grow support racks and opening through the floor means into said return duct means.

4. A controlled environment agriculture facility as defined in claim 2 wherein said air flow control means comprises a plurality of air collector means each carried by one of said plant grow support racks and each including means connecting it into said air return duct means.

5. A controlled environment agriculture facility as defined in claim 2 wherein said source of conditioned air comprises air cooling means operable to cool and thereby remove moisture from the return air from said enclosure, means enabling bypass of air around said cooling means to permit flow of return air directly to said enclosure, and means adjustably controlling said bypass means for control of humidity in the enclosure atmosphere.

6. The method of growing plants in a controlled environment agriculture facility in which at least a substantial part of the illumination needed for photosynthesis is provided by lamp means disposed in a spaced array within the facility, comprising the steps of:
   (a) providing a plurality of mobile plant grow racks of a number correlated to the number of lamp means as a multiple thereof;
   (b) placing said plant grow racks closely together in an array so configured with respect to the lamp array that in a first position of the grow rack array first alternate racks are fully illuminated while second alternate racks are not, and in a second position the relative illumination of said racks is reversed; and
   (c) periodically reciprocating said grow rack array back and forth between said first and second positions thereof to provide alternating periods for each rack during which the illumination level is above and below the plant compensation point.

7. A controlled environment agriculture facility comprising:
   (a) a plant growth module within which a controlled atmosphere may be maintained;
   (b) an array of plant grow support racks disposed within said module, said racks being each of rectangular configuration with width and length dimensions and being arrayed in proximity to each other with their length dimensions in parallel relation;
   (c) a plurality of lamps mounted in said enclosure above said racks and divided into groups with the lamps of each group disposed along a line parallel to the length dimension of the racks and with the lamp groups spaced along a line parallel to the width dimension of the racks, the spacing between such lamp groups being approximately equal to an integral multiple of the width dimension of said racks; and
   (d) means enabling said plant grow support rack array to be reciprocated between first and second positions within the module, said array when in said first position having a first half of the racks thereof disposed sufficiently directly below a respective one of said lamp groups to be fully illuminated thereby and having the other half thereof disposed between said lamp groups so as not to be fully illuminated thereby, and when in said second position having the relative intensities of illumination of the racks of its said halves reversed, thus enabling even distribution of illumination as between all the plant support racks while affording alternating intervals of relatively high and relatively low illumination for each, and enabling access to individual racks of the array by shifting only a portion of the array between its first and second positions.

8. A controlled environment agriculture facility as defined in claim 7, further including module atmosphere control means comprising:
   (a) a source of conditioned air including air cooling means;
   (b) air duct means for conveying conditioned air from said source into said module and for conveying return air therefrom to said source; and
   (c) means dividing and variably proportioning the return air between a first portion thereof passed through said air cooling means and a second portion which bypasses said cooling means and is subsequently combined with said first portion to provide conditioned air of controlled temperature and humidity;

9. The method of controlling humidity of the atmosphere within a controlled environment agriculture facility including a recirculating air system provided with air cooling means therein, comprising the steps of:
   (a) cropping the facility with plants the transpiration of which provides a continuing addition of water vapor into the atmosphere within the facility;
   (b) dividing the return air flow from the facility into first and second portions and passing only the first thereof through said air cooling means for cooling the air and removal of moisture therefrom;
   (c) recombining said first and second air portions for recirculation to the facility; and
   (d) variably adjusting the ratio of said first and second air portions to obtain a balance between the amount of water vapor added to the system by plant transpiration and that removed by condensation in the air cooling means, to thus maintain desired humidity in the system without other water addition thereto;

10. The method of controlling the moisture content of the atmosphere in a controlled environment agriculture facility as defined in claim 9, wherein time variations in moisture emission into the atmosphere by plant transpiration are reduced by the step of maintaining a portion of the plants in the facility fully illuminated on a continuous basis.

11. The method of growing plants in a controlled environment agriculture facility in which at least a substantial part of the illumination needed for photosynthesis is provided by lamp means disposed in a spaced array within the facility, comprising the steps of:

(a) providing a plurality of mobile plant grow racks of a number correlated to the number of lamp means as a multiple thereof;

(b) placing said plant grow racks closely together in an array so configured with respect to the lamp array that in a first position of the grow rack array first alternate racks are fully illuminated while second alternate racks are not, and in a second position the relative illumination of said racks is reversed;

(c) periodically shifting each of the grow racks of said array in sequence from said first position to said second position thereof to provide a change in illumination level for each rack with respect to the plant compensation point and to provide access to each rack in turn as it is shifted with respect to those next to it; and (d) periodically returning the racks of said array from said second position to said first position thereof.

* * * * *